United States Patent [19]
deSantis

[11] Patent Number: 4,858,225
[45] Date of Patent: Aug. 15, 1989

[54] VARIABLE BANDWIDTH VARIABLE CENTER-FREQUENCY MULTIBEAM SATELLITE-SWITCHED ROUTER

[75] Inventor: Pietro deSantis, Rockville, Md.

[73] Assignee: International Telecommunications Satellite, Washington, D.C.

[21] Appl. No.: 117,061

[22] Filed: Nov. 5, 1987

[51] Int. Cl.⁴ .............................................. H04J 3/06
[52] U.S. Cl. ...................................... 370/50; 370/104
[58] Field of Search .................. 370/50, 120, 123, 72, 370/75, 84, 104; 455/12, 13, 20, 22

[56] References Cited

U.S. PATENT DOCUMENTS

| | | | |
|---|---|---|---|
| 3,548,108 | 12/1970 | Yamato et al. | 370/95 |
| 4,144,495 | 3/1979 | Metzger | 455/12 |
| 4,228,401 | 10/1980 | Wachs et al. | 455/22 |
| 4,706,239 | 11/1987 | Ito et al. | 370/123 |

OTHER PUBLICATIONS

"Non-Regenerative Satellite-Switched FDMA Payload Technologies" by deSantis, Intelsat Technical Memorandum, Sep. 1986.
"Properties of a Constant-k Ladder SAW Contiguous Filter Bank" by Webb, IEEE Transactions on Sonics and Ultrasonics, vol. SU23, No. 6, Nov. 1976.
"Filter with Bandwidth Continuously Variable from 5–100 mhz" by Melngailis et al, 1977, Ultransonics Symposium Proceedings, IEEE Catalog #77CH1264–1SU.
"A Comparison of Frequency Domain Multiple Access and Time Domain Multiple Access Approaches to Satellite ... ", NASA Technical Memo 83430 by Stevens, Jun. 1983.
"Study of Advanced Communications Satellite Systems Based on SS-FDMA" by Kiesling, General Electric Space Division, May 1980.

*Primary Examiner*—Douglas W. Olms
*Assistant Examiner*—Melvin Marcelo
*Attorney, Agent, or Firm*—Cushman, Darby & Cushman

[57] ABSTRACT

Reconfigurable switching router connects to an existing connectivity network on board a multibeam communications satellite for increasing the flexibility thereof by providing variable bandwidth capability so that the satellite handles a multitude of individual users having different requirements of bandwidth and transmission rates. The bandwidth of at least one transponder channel is split into two portions. A first portion provides a VBVCF continuous passband while a second portion is further channelized in a reconfigurable fashion to achieve VBVCF subchannelization. The reconfigurable switching router utilizes a class of multi-level channelization formats implemented by a plurality of filter banks connected in parallel. A switching network performs VBVCF subchannel selection and routing via time and/or frequency multiplexing thereby to accommodate both VBVCF SSTDMA and SSFDMA traffic.

13 Claims, 8 Drawing Sheets

VARIABLE BANDWIDTH VARIABLE CENTER-FREQUENCY MULTIBEAM SATELLITE-SWITCHED ROUTER

BACKGROUND OF THE INVENTION

This invention relates to satellite communications systems, but more specifically, to a novel method and apparatus for providing on-board control of reconfiguration of interbeam connections in accordance with traffic demands in a multibeam communications satellite system.

In present commercial communications satellite systems operating at 6 and 4 GHz (C-band), 14 and 11 GHz (Ku-band) and 20–30 GHz (Ka Band), on-board connectivity between uplink and downlink beams is carried out on a transponder channel basis by providing "static" switching networks with occasional switch reconfigurations of about fifty to one hundred times per year. Switching schemes employed therein are suitable for carrying Frequency Division Multiple Access (FDMA) continuous traffic. Other satellite systems provide "dynamic" switching with reconfiguration periods of a few milliseconds suitable for carrying Satellite Switched Time Division Multiple Access (SSTDMA) burst traffic. Switching of communications paths between multiple uplink and downlink beams is usually performed by a switch matrix on a transponder channel basis. These on-board switch matrices map input (uplink) traffic into output (downlink) traffic, wherein switch configurations change only the output port connected to a given input port without changing the bandwidths of the respective interconnecting paths. This connectivity will be hereafter referred to as Constant Bandwidth ("CB") connectivity and the associated traffic "CB" traffic.

Present-day CB-FDMA communications systems only employ one-to-one static connectivity networks between uplink and downlink co-frequency transponder channels and utilize mechanical coaxial switches requiring no D.C. power to hold them in position after actuation. A typical switching for this application is a "rearrangeable switch matrix" architecture using "beta" elements as building blocks. On the other hand, present-day CB-SSTDMA (constant bandwidth satellite-switched time-division multiple access) communications satellite systems employ connectivity networks between uplink and downlink channels which utilize coupler cross-bar Microwave Switch Matrices (MSM) of either diodes or field-effect transistors (FETs) having rise-fall times of a few nanoseconds. No on-board satellite-switched TDMA systems having variable bandwidths are presently known to exist.

When on-board interbeam connectivity is represented by a matrix with entries corresponding to the bandwidths of the interbeam connection paths, then a CB connectivity function for one group of co-frequency transponder channels in a satellite system (e.g. 8 beams) at a given time instant is represented by an $8 \times 8$ matrix having only one non-zero element in each row or column. The following matrix is typical.

$$
\begin{array}{c}
\text{DOWNLINK BEAM No.} \\
\begin{array}{cccccccc} 1 & 2 & 3 & 4 & 5 & 6 & 7 & 8 \end{array} \\
\text{UP-LINK BEAM No.} \begin{array}{c} 1 \\ 2 \\ 3 \\ 4 \\ 5 \\ 6 \\ 7 \\ 8 \end{array}
\begin{bmatrix}
0 & B_T & 0 & 0 & 0 & 0 & 0 & 0 \\
B_T & 0 & 0 & 0 & 0 & 0 & 0 & 0 \\
0 & 0 & 0 & 0 & 0 & B_T & 0 & 0 \\
0 & 0 & B_T & 0 & 0 & 0 & 0 & 0 \\
0 & 0 & 0 & B_T & 0 & 0 & 0 & 0 \\
0 & 0 & 0 & 0 & B_T & 0 & 0 & 0 \\
0 & 0 & 0 & 0 & 0 & 0 & 0 & B_T \\
0 & 0 & 0 & 0 & 0 & 0 & B_T & 0
\end{bmatrix}
\end{array}
\quad [1]
$$

where $B_T$ is a transponder bandwidth for the respective channels. In SSTDMA systems, channel configuration is represented by the same matrix [1], but the non-zero matrix elements change their location periodically in time. A complete representation of the entire satellite interbeam connections comprises a number of such switch matrices equal to at least the number of transponder channels.

CB connectivity, in conjunction with the ability to steer spot beams over high traffic sources, so far has proven adequate for heavy route traffic with occasional connectivity changes. Also, for thin-route traffic, CB connectivity may be sufficient. For such traffic, on-board connectivity changes are minimal since carriers are somewhat dispersed in space and time.

Recently, however, in response to traffic demands including a relatively large number of small users, more "intelligent" satellites have been developed which adaptively achieve high satellite design efficiencies via narrow interbeam connectivity paths with reconfigurable bandwidths, e.g., Variable-Bandwidth, Variable Center-Frequency (VBVCF) on-board connectivity. Here, satellite design efficiency is defined as the ratio of saturation capacity to the nominal capacity of the satellite, and provides an indication of how efficiently satellite resources are utilized, such as, how on-board connectivity and antenna coverage match traffic demands.

According to an aspect of the present invention, VBVCF connectivity may be implemented without increasing the number of on-board TWTAs (travelling wave tube amplifiers) by subdividing a transponder bandwidth into a number of narrower channels of varying bandwidth and accommodating within the same transponder different thin route services with different connectivity requirements. Recent on-board TWTA linearization techniques and modulation formats make this design philosophy particularly attractive. As an example, services requiring a continuous band of variable width may be assigned upon demand to a sub-band $B_x$ of transponder bandwidth $B_T$ while the remaining bandwidth $B_T - B_x$ may be channelized into a multiplicity of narrow VBVCF channels suitable for multicarrier traffic with a varying number of different carriers. In its operation, each channel is subsequently routed to a defined downlink beam by a switching network.

A circuit that performs VBVCF demultiplexing and routing functions is called herein an "on-board router". Continuous FDMA traffic with on-board VBVCF connectivity achieved either partially or completely by on-board switching networks is called herein "VBVCF Satellite-Switched FDMA (SSFDMA) traffic". In accordance with a further aspect of this invention, existing CB connectivity is enhanced by providing both CB connectivity and VBVCF connectivity within the same spacecraft wherein the VBVCF connectivity is provided by an on-board router to provide satellite-switch capability.

As discussed herein, prior on-board routers for VBVCF connectivity were proposed as early as 1980, mainly in connection with continuous FDMA traffic. For example, U.S. Pat. No. 4,228,401 entitled "Communication Satellite Transponder Interconnection Utilizing Variable Bandpass Filter" and issued on Oct. 14, 1980 describes a system employing a payload which lacks on-board switching capabilities, but features reconfigurable beam interconnections using VBVCF filters achieved by a serial filter architecture. The VBVCF filter utilized therein performs two successive frequency translations of the signal frequency spectrum with respect to the fixed passbands of two equal filters being serially connected. Unfortunately, this technique, although useful for other applications (see, for example, J. Melngilis and R. C. Williamson, "Filter With Bandwidth Continuously Variable From 5 to 100 MHz", Proc. 1977 Ultrasonics Symp. pp. 965–968), has marginal practical utility for linear phase (constant delay time) communication channels due to the adding up of transmission amplitude and phase ripples in the serially connected passband filters in the vicinity of their upper edge frequency. On the contrary, in the inventive router described herein, the VBVCF demultiplexing function is implemented by a switchable combination of passband filters connected in parallel and does not suffer from the adding up of spectral impurities injected by serial filters.

The on-board FDMA routers proposed in the early eighties mainly relate to 30 and 20 GHz multiple beam satellite systems. At these frequencies, a large frequency spectrum is available for commercial satellite communications (2500 MHz times frequency reuse) and, consequently, prior routers were designed on the basis of broadband channelization schemes which accommodate large numbers of elementary channels which are frequency-multiplexed over large bandwidths. Reconfigurability was achieved by sorting out from a large number of available channels those which closely match user demands. For narrowband reconfigurable connectivity, very large filter banks and switch matrices are present in those routers. Hardware complexity as well as weight and volume render these routers unattractive and caused a shift of interest toward alternate on-board routing solutions such as SSTDMA (Satellite Switched Time Division Multiple Access).

A good summary of on-board SSFDMA router technologies sponsored by NASA is presented in "A comparison of Frequency Domain Multiple Access (FDMA) and Time Domain Multiple Access (TDMA) Approaches to Satellite Service for Low Data Rate Earth Stations", G. Stevens, NASA Tech. Memo. 83430, June 1983. A detailed description of past on-board FDMA router designs is presented in "Non-regenerative Satellite Switched FDMA (SSFDMA) Payload Technologies", P. de Santis, International Journal of Satellite Communications, April-June 1987, Vol. 5, pp. 171–190. Additional information may also be found in J. D. Kiesling, "Study of Advanced Communications Satellite Systems Based on SS-FDMA", G.E. Document No. 80SDS4217 NASA Contract No. NAB-3-21745, May 1980; J. D. Kiesling, "Direct Access Satellite Communications Using SS-FDMA", Proc. AIAA 8th CSSC, Orlando, FL, Apr. 20, 1980, pp. 627–633; and "Customer Premise Service Study for 30/20 GHz Satellite Systems", TRW Space and Technology Group, NASA Contract NAS-3-22889, Final Report, Document No. 038050-011, Apr. 22, 1982.

In view of the present state of the art of on-board technologies and the difficulties experienced in prior satellite routing systems in reconfiguring transponder channels, it is an objective of the present invention to provide a practical routing system for improving the efficiency and flexibility of handling traffic demands.

It is another object of the present invention to utilize advantageously existing on-board CB switching networks to enhance traffic handling capabilities thereof.

It is a more specific object of the present invention to provide a system for reconfigurably dividing a transponder bandwidth into at least two sub-bands of variable width wherein at least one sub-band is further channelized to achieve multiple VBVCF subchannels.

It is a further object of the present invention to provide a system for routing traffic through a demultiplexer with linear phase VBVCF channels which utilizes a "parallel" architecture and is based on a class of multi-level channelization formats preferably implemented by time and frequency multiplexing circuits.

It is yet a further object of the present invention to provide an on-board router with programmable routing of sub-channels to downlink beams wherein each sub-channel may accommodate either burst traffic (SSTDMA) or continuous traffic (SSFDMA).

SUMMARY OF THE INVENTION

Aspects of the invention are realized by a method and apparatus wherein CB connectivity enhancement is preferably carried out by a device, such as an on-board router, in conjunction with an existing CB connectivity network on board a multibeam communications satellite employing multiple transponder channels. Both CB and VBVCF traffic are beamed to the satellite in uplink beams of given bandwidths and center frequencies. Upon receipt, the bandwidth of each uplink beam is divided into a number of transponder channels of bandwidth $B_T$. The transponder channels carrying VBVCF traffic are further partitioned in a number of sub-transponder channels by the on-board router. Of these channels, one provides a continuous band of variable width which is particularly suitable to SSTDMA traffic with variable burst rate.

The method and apparatus can be appreciated with reference to matrix [1] above and assuming VBVCF traffic exists in uplink beams 5, 6, 7 and 8 and downlink beams 4, 5, 7 and 8. The enhanced CB connectivity matrix [2] is as follows:

$$\begin{array}{c}
\text{DOWNLINK BEAM No.} \\
j = \begin{array}{cccccccc} 1 & 2 & 3 & 4 & 5 & 6 & 7 & 8 \end{array}
\end{array} \quad [2]$$

$$i = \begin{array}{c} 1 \\ 2 \\ \text{UP-} \\ \text{LINK} \quad 3 \\ \text{BEAM} \quad 4 \\ \text{No.} \quad 5 \\ 6 \\ 7 \\ 8 \end{array} \begin{bmatrix} 0 & B_T^* & 0 & 0 & 0 & 0 & 0 & 0 \\ B_T^* & 0 & 0 & 0 & 0 & 0 & 0 & 0 \\ 0 & 0 & 0 & 0 & 0 & B_T^* & 0 & 0 \\ 0 & 0 & B_T^* & 0 & 0 & 0 & 0 & 0 \\ 0 & 0 & 0 & B_{X5} & B_{55} & 0 & B_{57} & B_{58} \\ 0 & 0 & 0 & B_{64} & B_{X6} & 0 & B_{67} & B_{68} \\ 0 & 0 & 0 & B_{74} & B_{75} & 0 & B_{77} & B_{X7} \\ 0 & 0 & 0 & B_{84} & B_{85} & 0 & B_{X8} & B_{88} \end{bmatrix}$$

where "*" entries represent CB traffic and the other entries represent VBVCF traffic. Connectivity paths with bandwidths $B_T^*$ are established by a CB connectivity network while paths $B_{ij}$ (i=5,6,7,8 and j=4,5,7,8) and $B_{xi}$ (i=5,6,7,8) are established in the on-board router. In matrix [2], bandwidth $B_{xi}$ is a fraction of a transponder bandwidth $B_T$, while $B_{ij}$ are fractions of the remaining $B_T - B_{xi}$.

$$\Sigma_j B_{ij} \leq B_T - B_{xi} \quad [3]$$

VBVCF reconfigurability is accomplished by changing the values of the entries $B_{xi}$, $B_{ij}$.

A preferred method to enhance CB traffic in an existing on-board CB network is carried out by interfacing a device, such as an on-board router, with the CB network. The preferred method further includes the steps of dividing the transponder bandwidth into two parts wherein one part is further channelized establishing respective bandwidths and center frequencies of the elementary VBVCF traffic channels, re-routing the VBVCF traffic through the CB network to downlink beams, and controlling the center frequencies and bandwidths (e.g. values of $B_{xi}$ and $B_{ij}$) of the VBVCF channels.

According to the apparatus of the invention, an on-board router is serially connected to and operates simultaneously with CB networks existing on-board the spacecraft. The router includes means to receive VBVCF traffic of given bandwidths and center frequencies, means to partition a transponder bandwidth into at least two sub-bands, means to channelize further at least one of the sub-bands to establish a plurality of elementary channels that carry the VBVCF traffic, and switching means to translate or map uplink to downlink paths within the router and CB network. The bandwidths and center frequencies of the elementary VBVCF channels may be controlled externally.

The system accommodates CB and VBVCF traffic wherein the CB traffic requires constant bandwidth connectivity with occasional reconfigurations and the VBVCF traffic requires variable bandwidth connectivity.

These and other objects, aspects and features of the invention will become apparent to those skilled in the art upon consideration of the following description of the illustrative embodiments taken in connection with the accompanying drawings. The invention though is pointed out with particularity by the appended claims.

DESCRIPTION OF ILLUSTRATIVE EMBODIMENTS

Figure 1A:
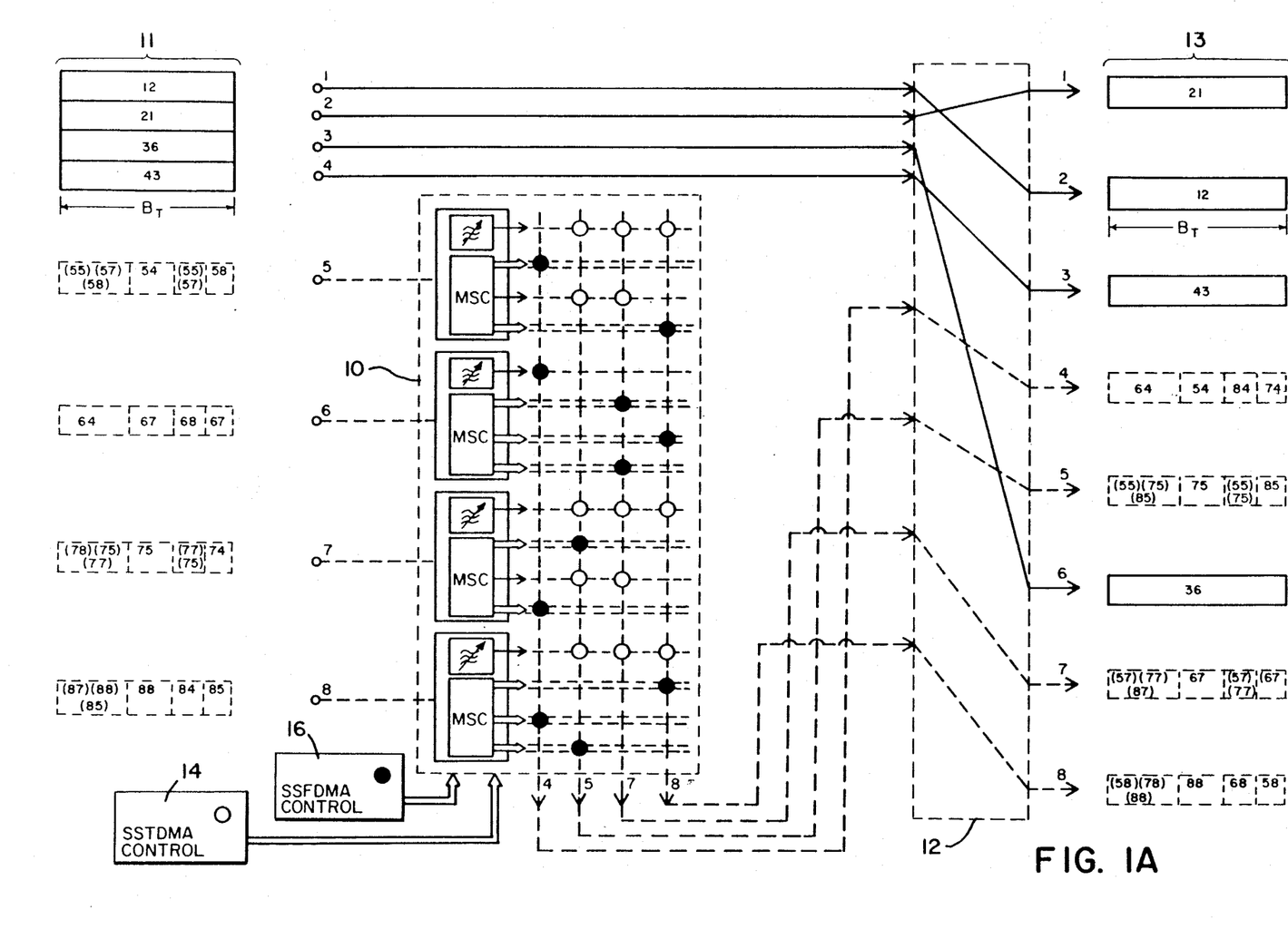
FIG. 1A is a block diagram of a preferred on-board router in accordance with the present invention coupled with a typical CB connectivity network of a satellite. Illustrative uplink and downlink frequency plans also are shown.
Figure 1B:
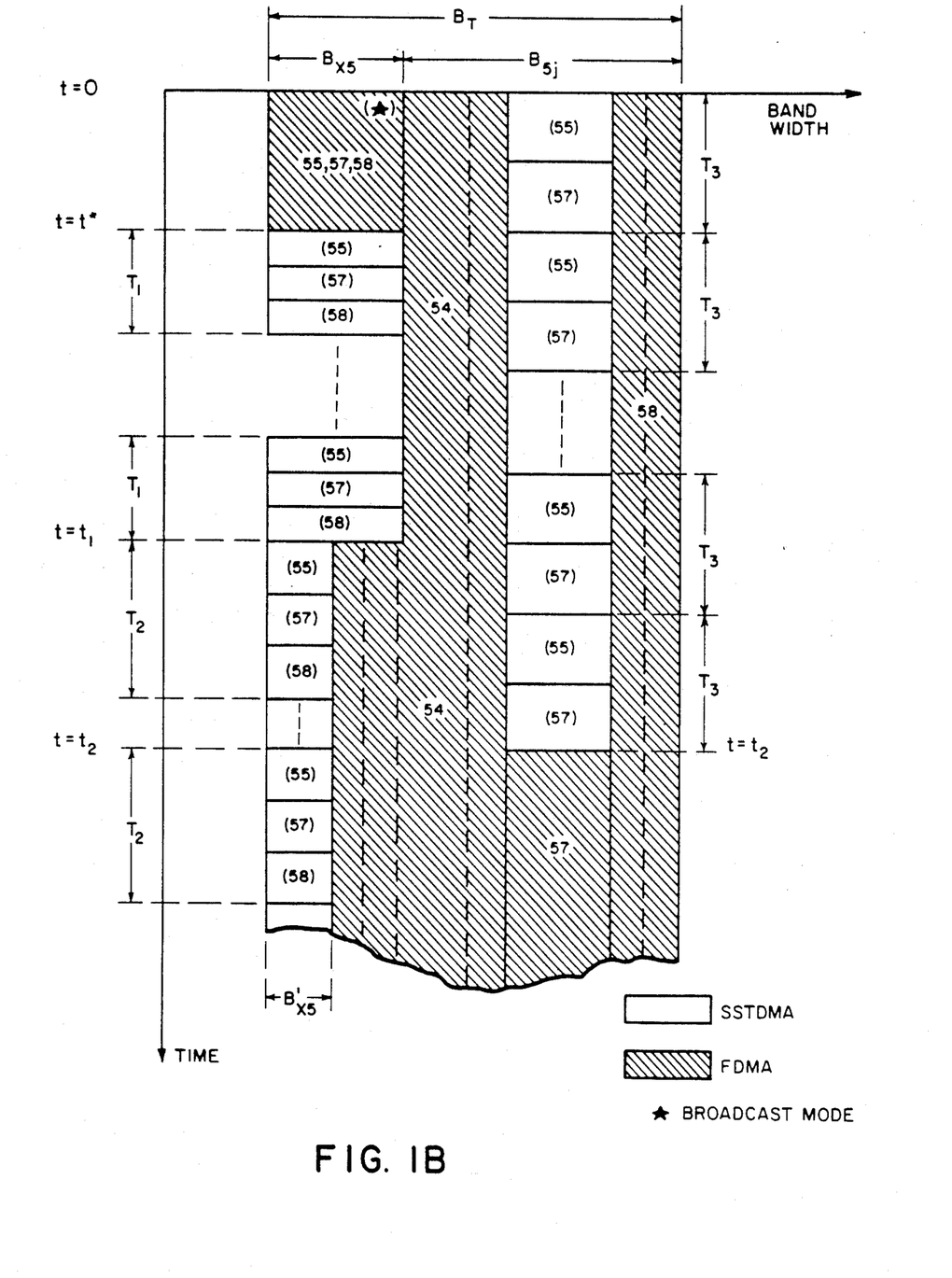
FIG. 1B is a conceptual depiction of bandwidth configuration versus time characteristics of channel routing achieved by the on-board router of FIG. 1A.

Referring to FIGS. 1A and 1B, an on-board router 10 couples with an existing on-board CB connectivity network 12 to achieve CB connectivity enhancement. The router 10 and CB network 12 are located on board a communications satellite and provide reconfigurable interconnection paths between uplink and downlink beams in accordance with exemplary frequency plans 11 and 13, respectively. These paths may carry digital traffic from digitized telephone voice signals and/or data communications systems requiring varying rates of data transmission, as well as varying volumes of analog FM traffic. Further, these paths may accommodate either FDMA or TDMA traffic in accordance with the present invention. As previously indicated, CB refers to Constant Bandwidth transponder traffic whereas VBVCF refers to Variable Bandwidth Variable Center Frequency sub-transponder traffic. The widths of the rectangles within the blocks of frequency plans 11 and 13 generally indicate the bandwidth requirement of the traffic along a specific path. Continuous and dashed lines correspond to CB and VBVCF traffic, respectively. For example, the first four blocks of uplink frequency plan 11 indicate CB traffic, occupying the entire transponder bandwidth $B_T$ whereas the rectangles in the latter four blocks of plan 11 respectively indicate bandwidth requirements of VBVCF traffic in each of the four channels 5-8.

Uplink frequency plan 11 shows a possible transponder channelization according to the previously defined enhanced connectivity matrix [2]. By transponder frequency plan, it is meant a given division of transponder frequency band into a set of sub-bands corresponding to various traffic paths. In each block of plan 11, the two digits in each pair represent respectively the numerical identity of the origin and destination beams as also indicated at the respective inputs and outputs of router 10 and CB network 12 in FIG. 1A. Likewise, downlink frequency plan 13 depicts the character of the downlink channels and also indicates the translated path sequences by origin and destination beam number. More than one pair of digits within the same rectangle indicates that a particular bandwidth is utilized for a multiplicity of interconnection paths. Digit pairs within parentheses refer to SSTDMA traffic, whereas digit pairs without parentheses refer to FDMA traffic.

According to the present invention, frequency plan 13, also, shows typical satellite-switched interbeam connections and translations for both CB and VBVCF traffic. Uplink beams 1-4 handle CB traffic routed through CB connectivity network 12, while uplink beams 5-8 handle VBVCF traffic routed through the network 12 and the router 10. The router 10 connects in series and simultaneously operates with the static connectivity network 12. It also partitions VBVCF traffic and routes VBVCF traffic to th appropriate downlink beams.

Figure 2:
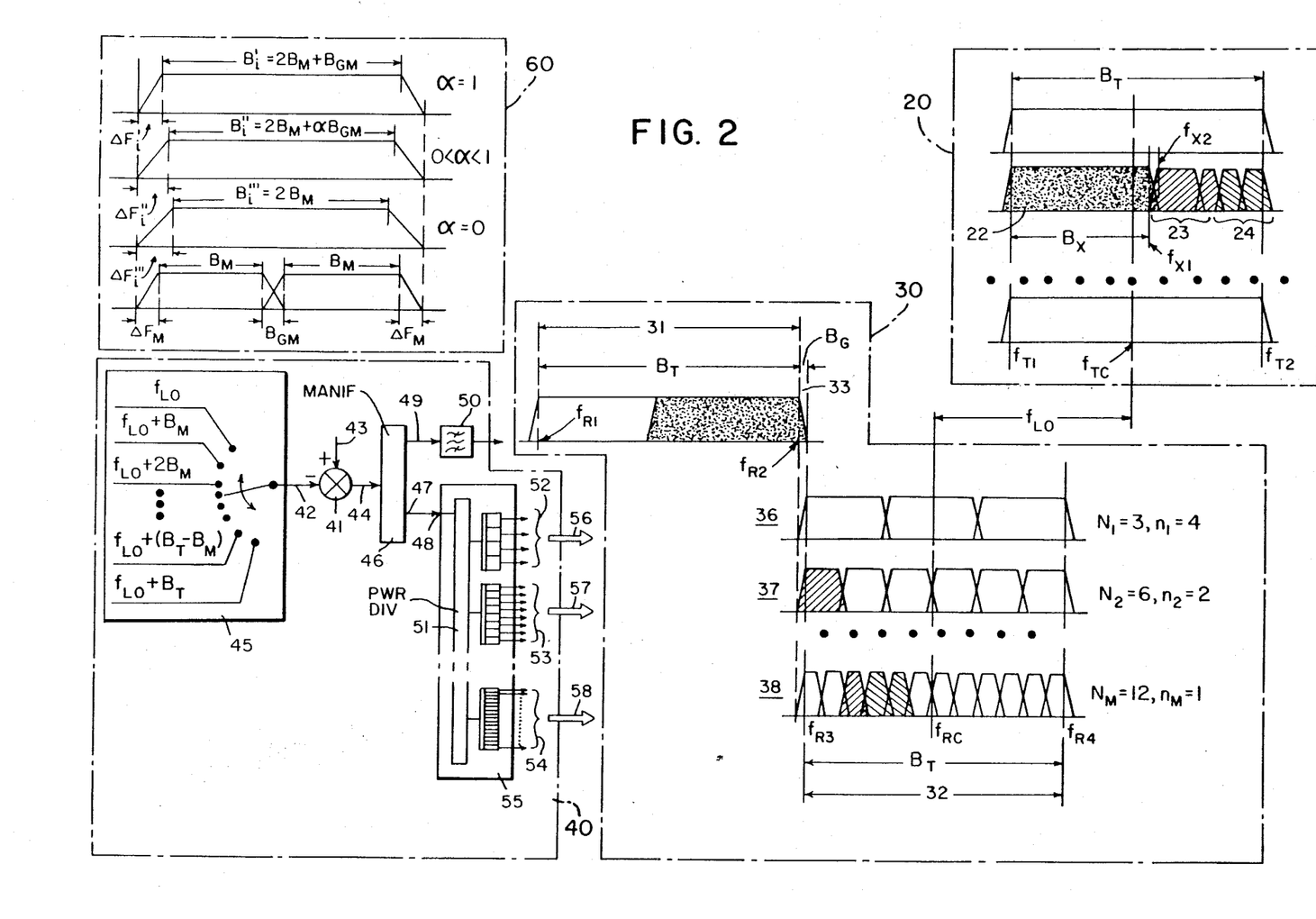
FIG. 2 depicts the input section 40 of the on-board router of FIG. 1A, and conceptually shows an uplink frequency plan 20 relative to a group of co-frequency transponders in an N-beam communications satellite, a channelization plan 30 achieved by the on-board router for routing through the CB connectivity network, and a preferred band-splitting scheme 60 required to achieve the principles of the present invention.

For purposes of illustration, the router 10 comprises a VBVCF filter connected in parallel with an internal multistage channelizer (MSC) defined in connection with FIG. 2. The MSC is connected to a coupler crossbar switching network controlled by SSTDMA controller 14 and SSFDMA controller 16. Switches in any row of the switch matrix may be activated according to either a periodic time pattern typical of SSTDMA applications (burst traffic) or a reconfiguration time plan typical of SSFDMA applications (continuous traffic), respectively, utilizing either the SSTDMA controller 14 or the SSFDMA controller 16. Switching points shown in the router 10 controlled by the SSTDMA controller 14 are depicted as open circles, while switching points controlled by the SSFDMA controller 16 are depicted as black dots. This configuration of the switch matrix exists for a given instant of time. At a different time instance, switch controllers 14 and 16 may effect other switch configurations.

FIG. 1(B) is a bandwidth-versus-time representation of a hypothetical channelization plan relative to traffic originating from uplink beam no. 5. Digit pairs in FIG. 1(B) representing origin/destination paths correspond to digit pairs shown in FIG. 1(A). Subchannel division also corresponds. At time t=0, the bandwidth $B_{x5}$ is initially utilized by an SSFDMA broadcast mode through paths [55], [57], [58] wherein traffic originates in beam 5 and is simultaneously broadcast to downlink beams 5, 7 and 8. At time t=t*, the operation mode changes into an SSTDMA mode with a frame duration of $T_1$. Within each frame $T_1$, information in subchannel $B_{x5}$ is time-multiplexed through respective paths [55], [57] and [58]. At time t=$t_1$, a router reconfiguration occurs whereby the bandwidth $B_{x5}$ allocated to paths [55], [57] and [58] in the SSTDMA mode shrinks to $B'_{x5}$, and concurrently, the frame duration changes from $T_1$ to $T_2$, wherein the multiplexed intervals enlarge. The bandwidth ($B_{x5}-B'_{x5}$) is now utilized to widen the bandwidth of the [54] interconnection path for carrying SSFDMA traffic. Another reconfiguration occurs at t=$t_2$. In this case, no bandwidth variation occurs, but the [55] and [57] SSTDMA mode paths with a frame period $T_3$ are changed into a continuous SSFDMA mode path [57] with the same bandwidth.

No CB traffic switching occurs within the router 10. C traffic is switched only by the static connectivity network 12 and VBVCF traffic is independently switched by the router 10. Consequently, CB and VBVCF traffic switching may utilize different technologies in accordance with the different requirements of the two types of traffic.

Router 10 includes switch matrices and control means for independently routing the respective incoming traffic to specific downlink beams through the network 12. It also includes filter banks for channelizing a portion of a transponder channel at controllable bandwidths and center frequencies thereby establishing narrow band paths for the elementary channels of VBVCF traffic. Preferably, these filter banks have bandpass characteristics with high skirt selectivity. Skirt selectivity in dB/MHz is defined here as the ratio of 39 dB to the 1-40 dB transition bandwidth, i.e. the difference between the 40 dB bandwidth and the 1 dB bandwidth divided by two.

FIG. 2 shows the input section of the router 10 and illustrates a typical frequency partitioning of one of the eight transponder channels. A description of one such channel is exemplary of the remaining transponder channels. FIG. 2 shows an ideal transponder uplink frequency plan 20 relative to a group of co-frequency transponders in an N-beam satellite communications system, an exemplary frequency plan 30 implemented by the on-board router 10, and a band-splitting scheme 60 utilized for achieving the goal of the present invention. A typical satellite communications system includes several such groups of transponders for relaying traffic information among beams. In frequency plans 20 and 30 each traffic channel is ideally represented by a trapezoid whose upper and lower sides demarcate the useful (e.g. 1 dB) and the 40 dB bandwidth. The distance between the upper sides of two adjacent trapezoids will be hereafter referred to as the guardband $B_G$.

A transponder's center frequency is defined as $f_{TC}=(f_{T1}+f_{T2})/2$ where $f_{T1}$ and $f_{T2}$ which are the lower and upper edge frequencies, define the 1 dB attenuation points, respectively. As an example, single carrier, variable bit rate traffic in uplink plan 20 occupies a useful bandwidth $B_x$ 22 from $f_{T1}$ to $f_{x1}$ while multicarrier traffic occupies a bandwidth $B_T-B_x$ from $f_{x2}$ to $f_{T2}$. In this example, multicarrier traffic is assigned to two connectivity paths 23 and 24 each containing traffic destined to the same downlink beam.

The on-board router frequency plan 30 preferably consists of two fixed adjacent passbands 31 and 32 whose useful bandwidths extend from $f_{R1}$ to $f_{R2}$ in passband 31, and from $f_{R3}=(f_{R2}+B_G)$ to $f_{R4}$ in passband 32. Passbands 31 and 32 need not be adjacent, but preferably are so to efficiently utilize the total bandwidth of the transponder channel. Shaded areas in passbands 31 and 32 correspond to beam No. 2 traffic 22, 23, and 24, respectively. Passband 31 is allocated to single carrier traffic and is provided by a fixed bandpass filter with very high skirt selectivity to achieve high spectrum utilization. It is assumed that the 1 dB-40 dB transition bandwidth 33 at the upper edge frequency $f_{R2}$ equals the guardband $B_G$ associated with the M-th channelization level of passband 32. Under these circumstances, the adjacent channel interference (ACI) between single carrier and multicarrier traffic is suppressed more than 39 dB. The center frequency of passband 32 is $f_{RC}=(f_{R3}+f_{R4})/2$. It is referred to hereafter as the "router center frequency" whose choice is mainly dictated by the technology utilized for implementing the router's filters.

As a further constraint for implementing the exemplary plan of FIG. 2, $f_{R2}-f_{R1}=f_{R4}-f_{R3}=B_T$. $B_T$ represents the largest value needed for $f_{R4}-f_{R3}$ to accommodate any value of $0 \leq B_X \leq B_T$. In practice, assuming a minimum loading factor $LF_{min} = 100\, B_{X,min}/B_T$ for single carrier traffic, then this inequality becomes:

$$B_{X,min} = (LF_{min} B_T)/100 \leq B_X - B_T \qquad [4]$$

and $$f_{R4} - f_{R3} = B_T - B_{X,min} \qquad [5]$$

As an example, if $LF_{min} = 50\%$ $$B_{X,min} = B_T/2 \text{ and}$$

$$f_{R2} - f_{R1} = B_T \qquad [6]$$

$$f_{R4} - f_{R3} = B_T/2 \qquad [6']$$

Passband 32 is reused M times by M filterbanks in the router 10. The M filterbanks are connected in parallel to avoid additive distortion typical in serially connected filters. Each filterbank constitutes a "stage" of a multi-stage "parallel" channelizer and implements a channelization "level" of the multi-level channelization plan. In essence, each filter bank channelizes bandwidth 32 into a number of elementary VBVCF channels. In each stage, the elementary channels differ by their center frequency and may have equal or different useful bandwidths, transition bandwidths and guardbands. According to one arrangement, the $N_i$ passband filters at the i-th channelizer stage have the same nominal values of bandwidth $B_i$, guardband $B_{G,i}$ and 1-40 dB transition bandwidth $\Delta F_i$ in order to minimize hardware complexity. The channelization level with the smallest number $N_1$ of elementary channels will be hereafter referred to as the lowest level. The channelization level with the highest number $N_M$ of elementary channels will be referred to as the highest level.

For the case where two adjacent channels separated by two passband filters have the same insertion loss at their edge frequencies and the guardband between them is $B_G$, then in a given channel, the maximum adjacent channel interference $ACI_{max}$ (namely the minimum C/I if C is the desired signal power and I is the interference signal power) caused by an adjacent channel with a lower center frequency is equal to the increment of the adjacent channel insertion loss associated with an increase of $B_G$ in the upper edge frequency. If the adjacent channel has a higher center frequency, $ACI_{max}$ is equal to the increment of the adjacent channel insertion loss associated with a decrease of $B_G$ in the lower edge frequency.

In the present invention, the preferred channelization plans satisfy the following property. Frequency-division multiplexing of elementary channels selected from different channelization levels generate a VBVCF channel sequence wherein $(ACI)_{max}$ between two channels, is smaller than a specified value or, alternatively, $(C/I)_{min}$ between any two channels is larger than a specified value. A mathematical formulation of the above property is indicated below.

(1) The useful (i.e. 1 dB) bandwidth to be channelized is completely filled by an integer number $N_M$ of elementary channels of bandwidth $B_M$ plus an integer number $(N_M 1)$ of guardbands $B_{GM}$, namely:

$$B_T = N_M B_M + (N_M - 1) B_{GM} \qquad [7]$$

(2) With reference to the router frequency plan 30 of FIG. 2, letting $\Delta F_M = B_{GM}$ and $n_i$(integer) $= N_M/N_i$, the condition that one i-th level channel may replace $n_i$ channels of the M-th level requires:

$$B_i + 2\Delta F_i = n_i B_M + (n_i - 1) B_{GM} + 2 B_{GM} \qquad [8]$$

More in general, equation [8] may be recast in parametric form:

$$B_i = n_i B_M + \alpha(n_i - 1) B_{GM} \qquad [9]$$

$$\Delta F_i = B_{GM}[1 + \alpha + n_i(1 - \alpha)]/2 \qquad [10]$$

utilizing a parameter $0 \leq \alpha \leq 1$ to be chosen on the basis of available resources (e.g. frequency spectrum and filter technology) as well as system requirements. Spectral graphs 60 of FIG. 2 represents a portion of a channelization format with $n_i = 2$ for the three cases of $\alpha = 0$, for $0 < \alpha < 1$, and $\alpha = 1$. For $\alpha = 1$, transition bandwidth is minimal thus providing more useful bandwidth for carrying information.

(3) The condition that $(C/I)_i$ between any two adjacent channels at the i-th level is larger than a minimum value $(C/I)_{min}$ requires that:

$$B_{Gi} = 2\Delta F_i - B_{GM} = B_{GM}[\alpha + n_i(1 - \alpha)] \qquad [11]$$

Channelization formats which satisfy equations [7] through [11] and have different values of the parameter $\alpha$ differ from one another by channel shape factors $(SF_i = 1 + 2\Delta F_i/B_i)$, spectrum utilization efficiency $(\eta_i = 100\, N_i B_i/B_T)$ and adjacent channel interference $(C/I)_i$. For example, the channelization format 30 of FIG. 2 ("brickwall" format) provides maximum $\eta_i$ and satisfies the condition $\alpha = 1$, so that, from equations [10] and [11]:

$$B_{Gi} = \Delta F_i = \Delta F_M = B_{GM} \qquad [12]$$

For $N_M = 12$, a brickwall channelization format has five possible levels as shown in the following table [13]:

| CHANNELIZATION LEVEL | $N_i$ | $n_i$ | $\alpha = 0$ | | $\alpha = 1$ | |
|---|---|---|---|---|---|---|
| | | | $SF_i$ | $\eta_i$ | $SF_i$ | $\eta_i$ |
| i = 1 | 2 | 6 | 1.291 | 88.88 | 1.069 | 98.30 |
| 2 | 3 | 4 | 1.312 | 85.71 | 1.105 | 96.81 |
| 3 | 4 | 3 | 1.333 | 84.21 | 1.143 | 94.91 |
| 4 | 6 | 2 | 1.375 | 82.75 | 1.222 | 91.52 |
| M = 5 | 12 | 1 | 1.500 | 81.30 | 1.500 | 81.30 | having assumed $B_{GM}/B_M = 0.25$ namely $SF_M = 1.5$. In FIG. 2, the channelization levels shown correspond to above levels i = 2, 4 and 5. From Table [13], it is apparent that a consequence of the $\alpha = 1$ condition is a decrease in $SF_i$ and an increase in $\eta_i$ as the elementary channel bandwidth $B_i$ increases (e.g., lower channelization levels). A decrease of $SF_i$ to values too close to unity (ideal rectangular box filter) might pose severe technological problems in a practical realization of such filters at the lower channelization levels. For this reason, other channelization formats may be considered, e.g. with smaller values of the parameter $\alpha$. In general, for $0 \leq \alpha \leq 1$, $$SF_i = 1 + \frac{n_1 + 1 - \alpha(n_i - 1)}{n_i(B_M/B_{GM}) + \alpha(N_i + 1)} \qquad [14]$$

As an example, for $\alpha = 0$, table [13] shows $SF_1 = 1.291$ (as compared to $SF_1 = 1.069$ for $\alpha = 1$). Unfortunately, higher shape factors determine lower spectrum utilization efficiencies. An optimum solution results from a trade-off among $SF_i$, $\eta_i$ and $ACI_i$ requirements.

A description of the router's input section 40 is now made with reference to FIG. 2. Router input section 40 includes an input downconverter 41, a paralleling circuit 46 with one input port and two output ports which couple in parallel a bandpass filter 50 having the transmission characteristic of passband 31, and a channelizer 55 for developing the subchannels in passband 32. The downconverter 41 is a conventional circuit that frequency-translates a given frequency band from a given center-frequency to a lower center-frequency and may be implemented by conventional circuits known in the art, e.g. a frequency mixer followed by a filter. A paralleling circuit that parallels two bandpass filtering circuits, such as the bandpass filter 50 and the channelizer 55 with minimum insertion loss between the input and output ports, may be implemented by conventional means in a number of ways depending on how the router filters are constructed. For example, it may be constructed of two serially connected three-port circulators with one port terminated on a matched load, if the filters operate at microwave frequencies; or it may be constructed by a constant-k ladder network if the filters operate at Surface Acoustic Wave (SAW) frequencies. See, for example, D. C. Webbs and C. Banks, "Properties of a Constant-K Ladder SAW Contiguous Filter Bank", IEEE Trans. on Sonics and Ultrasonics, Vol. SU-23, No. 6, pp. 386-393, Nov. 1976.

The channelizer 55 includes a 1:M power divider 51 which divides incoming power within passband 32 into M parallel branches including M filter banks 52, 53 and 54. If needed, any power dividing loss $10 \log_{10} M$ (dB) may be either partially or totally offset by linear amplifiers. The router input section 40 also includes a synthesized frequency source 45 which generates a local oscillator frequency $f_{LO}+B_X$, with $f_{LO}=f_{TC}-f_{RC}$, and $B_X$ varies between zero and $B_T$ in discrete steps of width $B'_M=(B_M+B_G)$. Preferably, a crystal source with a divide-by-n counter is employed to achieve frequency stability although other types of stable sources may be employed.

If a minimum loading factor $LF_{min}$ is assumed, then $B_X$ varies within the interval $B_{X,min}<B_X<B_T$. The input traffic signal is applied to port 43 of the downconverter 41 and simultaneously a local oscillator signal of frequency $f_{LO}+B'_X$ (where $B'_X=B_X+B_G$) is applied to the downconverter via port 42. Downconverter 41 translates $f_{X1}$ onto $f_{R2}$ according to the relationship $f_{X1}-(f_{LO}+B'_X)=f_{R2}$. In this way, all single carrier traffic remains within passband 31 while all multicarrier traffic is within passband 32. Traffic within the bandwidth 32 emerges from port 47 of the paralleling circuit 46. Output 47 is connected to the input 48 of the 1:M power divider 51 which feeds the incoming signals to the M filterbanks 52, 53, 54. Filterbank 52 implements the lowest channelization level and generates $N_1$ outputs 56 of bandwidth $B_1$. Filterbank 53 implements the next highest channelization level and generates $N_2$ elementary channels 57 of bandwidth $B_2$. The last filterbank 54 implements the highest channelization level M and generates $N_M$ elementary channels 58 of bandwidth $B_M$. Outputs 56, 57 and 58 are applied to the input ports of a switching network in the router 10 described below in connection with FIG. 3. Although three stages are described to implement the M channelization levels, the invention is not limited to three stages.

Figure 3:
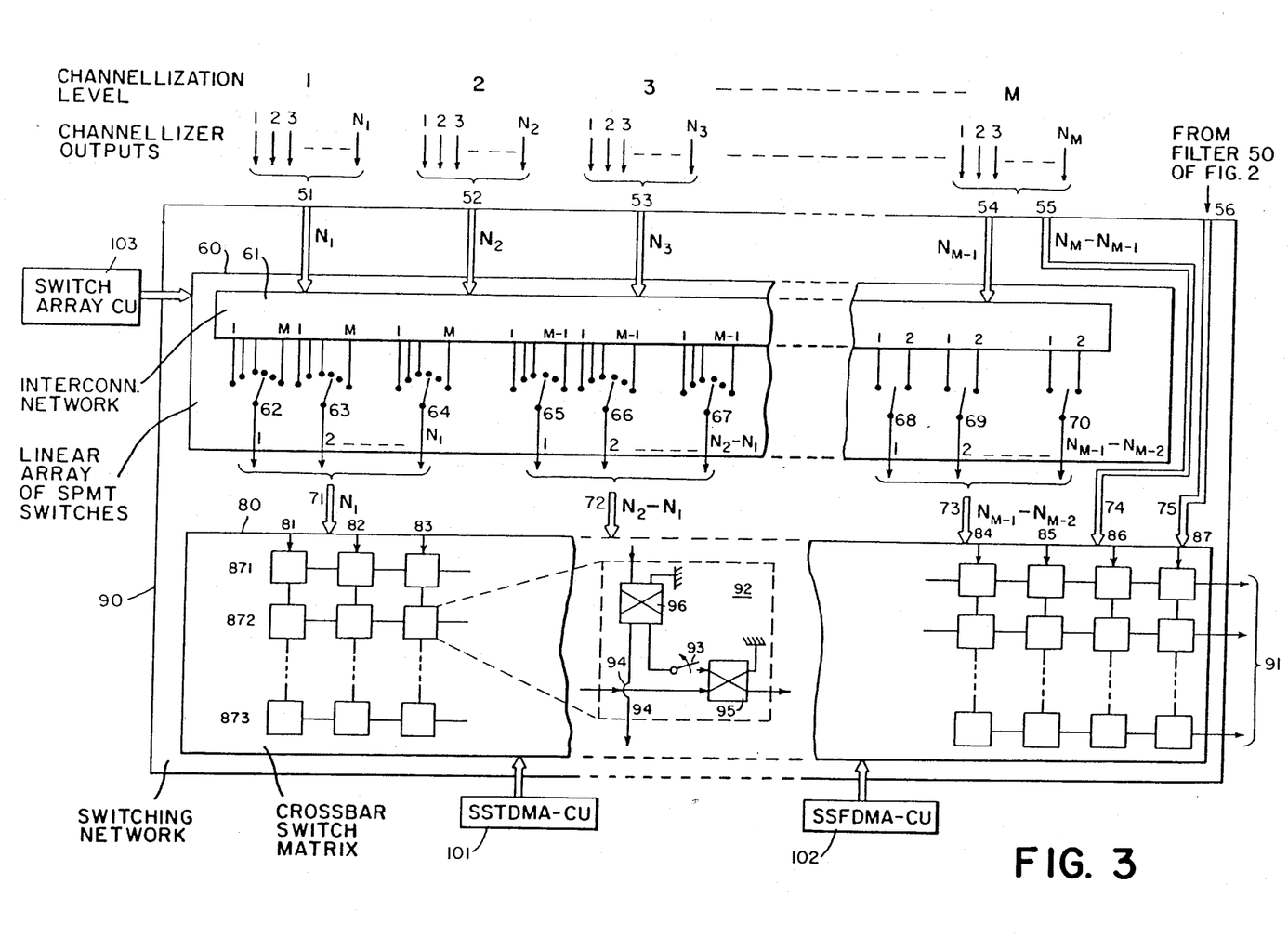
FIG. 3 shows a schematic block diagram of a preferred switching network incorporated in the on-board router of FIG. 1A, and also depicts the details of one element of the crossbar switching matrix of FIG. 3.

FIG. 3 shows a schematic block diagram of a switching network 90 which couples to the bandpass filter 50 (FIG. 2) as well as to the channelizer 55 (FIG. 2) of FIG. 2 in order to switch the M outputs 56, 57, 58 (FIG. 2). In operation, network 90 performs (i) selection of any elementary channel from any channelization level; (ii) multiplexing the selected channels by FDM (frequency-division multiplexing) techniques, and (iii) routing the channel groups formed in (ii) to the desired downlink beams. The channelization format 30 (FIG. 2) and, in general, channelization formats satisfying equations [7]-[11] allow the switching network 90 to perform the two functions indicated by FIG. 4, namely (a) to connect one-out-of-many input signals with overlapping bands to a single output port, at successive instants of time, and (b) to connect simultaneously plural input signals with non-overlapping bands to a single output port. Network 90 is preferably implemented by using two multiport switching networks performing these respective functions, hereafter referred to as switching networks 60 and 80.

Switching network 60 (FIG. 3) is implemented by a linear array of single pole multi-throw (SPmT where m=2,3,4 ... M) switches 62-70 connected to the channelizer outputs 51, 52, 53, and 54 via an interconnection network 61. The switches 62-70 may advantageously be operated and controlled by a control unit 103 in a conventional manner by a microprocessor or mechanical means on board the satellite or automatically in response to earth command signals, or by other means known in the art.

Figure 4:
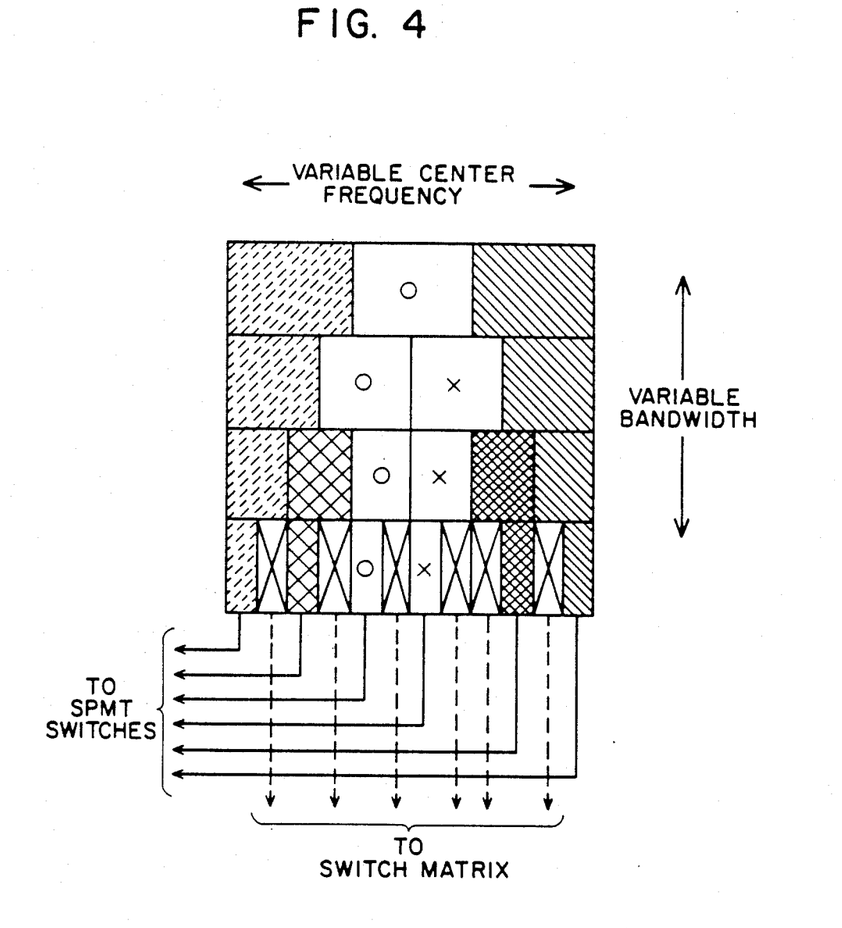
FIG. 4 conceptually illustrates the basic design philosophy of the switching network contemplated by the present invention.

Switching network 80 preferably comprises a crossbar switch matrix with ($N_M+1$) columns 81, 82, 83, 84, 85, 86, 87 and $N_X$ rows 871, 872, 873, $N_X$ being the number of down-link beams. The individual switch matrix crosspoints of the switch matrix 80 are able to provide both "broadcast" (one input to many outputs) and "report" (many inputs to one output) mode of operation. For example, they may be of the type shown in the insert of FIG. 3 with a SPlT switch 93, a crossover 94 and two directional couplers 95 and 96. This is a traditional architecture presently used in many on-board microwave switch matrices. See, for example, P. T. Ho, et al. "Coupler Crossbar Microwave Switch Matrix", Proceedings IEEE-MTT Symp. June 1982, pp. 239-241. Each crossbar switch matrix column may be controlled either by one of two control units (CU), SSTDMA controller 101 or SSFDMA controller 102, which is capable of providing signals for fast periodic reconfigurability (SSTDMA) or aperiodic reconfigurability (SSFDMA). The $N_X$ outputs 91 of the switch matrix 80 emanate from the SPmT switch array 60 at the connection points 71, 72, and 73, or directly from the channelizer 55 (FIG. 2) at the connection point 74 and from the passband filter 50 of FIG. 2 at the interconnection 75. FIG. 4 illustrates the philosophy of the channelizer connections for an exemplary situation.

With the aid of FIG. 4, it is understood that the switching network 90 of FIG. 3 has the capability to couple one-out-of-many input signals with overlapping bands to a single output port at successive instants of time, and/or to connect simultaneously plural inputs with non-overlapping bands to a single output port. It shows a channelization format with $N_1=3$, $N_2=4$, $N_3=6$ and $N_M=N_4=12$. Bands illustrated with the same graphical markings are switched by the same SPmT switch with the exception of the 4-th level bands with crossed bars which are for traffic directly connected to the crossbar switch matrix 80 of FIG. 3 at the input port 74. Partitioning of bands into groups switched by the same SPmT switch has been made according to a criterion of minimum number of switches. It is, however, recognized that different criteria may be adopted, e.g. minimizing the number of throws in each switch.

From the example of FIG. 4, it is apparent that application of this criterion leads to a switching network with three SP4T, one SP3T, two SP2T switches and that six filters out of twelve in the 4-th channelizer stage directly connect to the switch matrix. More in general, application of the criterion of minimum number of switches, generates the following features which are apparent in FIG. 3. The input to the switching network 90 from the M-th filter bank splits into two groups of elementary channels 54 and 55: a group of $N_{M-1}$ channels goes to the SPmT switch array 60 and the remaining $N_M - N_{M-1}$ channels go directly to some input ports 74 of the crossbar switch matrix 80. The structure of the SPmT switch array 60, as shown in FIG. 3, is as follows:

| Number of Switches | Switch Type |
|---|---|
| $N_1$ | SPMT |
| $N_2 - N_1$ | SP (M−1) T |
| $N_3 - N_2$ | SP (M−2) T |
| ... | ... |
| $N_{M-1} - N_{M-2}$ | SP2T |
| Total: $N_{M-1}$ | |

From Table [15] it is apparent that $N_{M-1}$ determines the total number of SPmT switches, M and $N_1$ control the complexity and the number of the largest SPMT switches. The size of the crossbar switch matrix 80 is determined by $N_M$ and $N_X$.

Figure 5A:
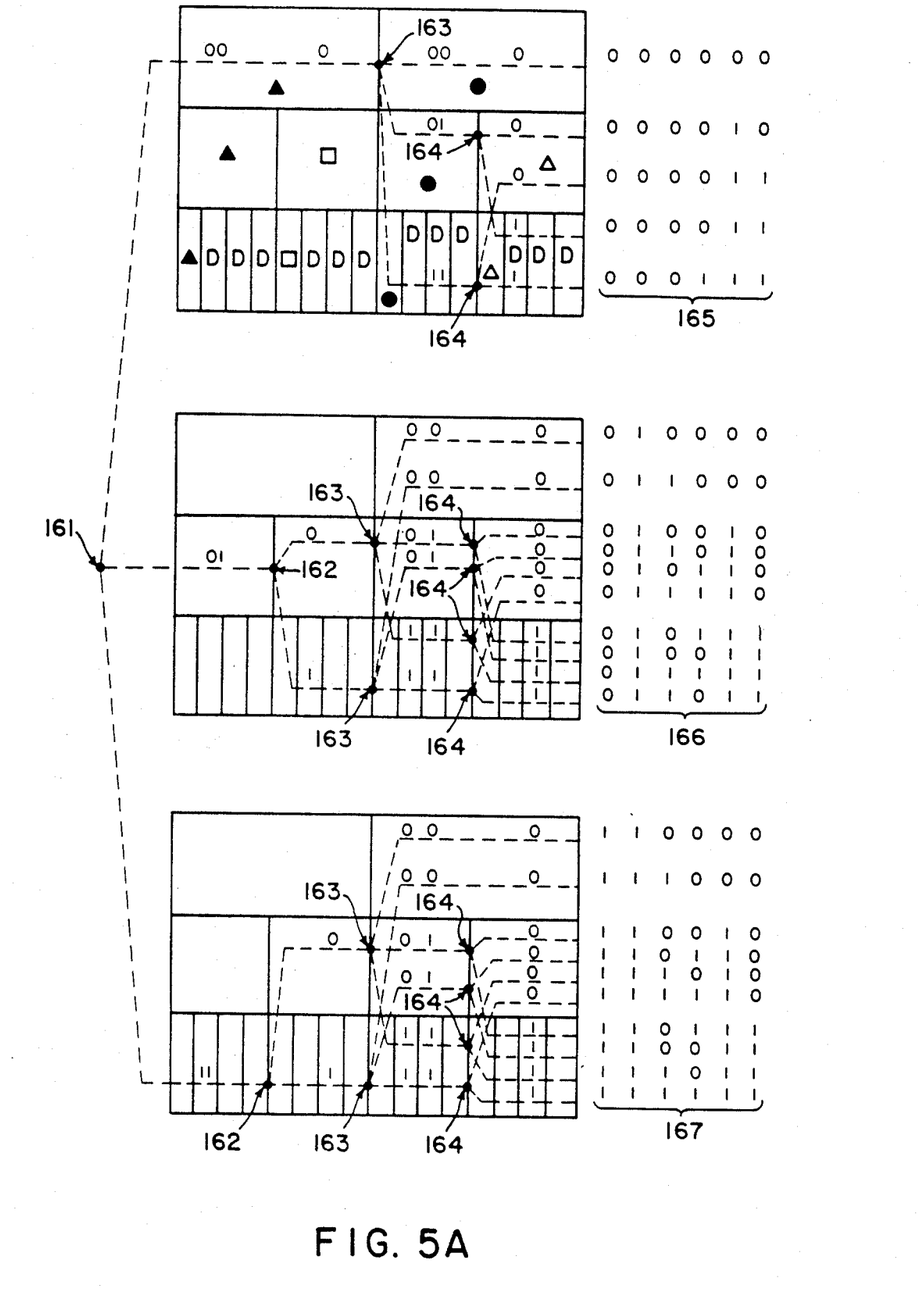
FIGS. 5(a) through 5(c) illustrate a practical example of channel routing and controlled switching in the on-board router of FIG. 1A.

FIG. 5(a) illustrates a mechanism to identify and label all possible VBVCF channel sequences which may be generated by a given channelizer. For purposes of illustration, a channelization format with $N_1=2$, $N_2=4$, $N_M=N_3=16$ has been chosen.

Figure 5B:
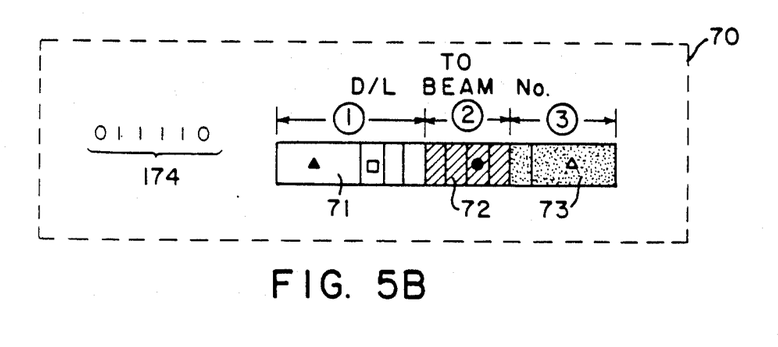

FIG. 5(b) depicts a channelization sequence which, as an example, has been chosen to be implemented.

Figure 5C:
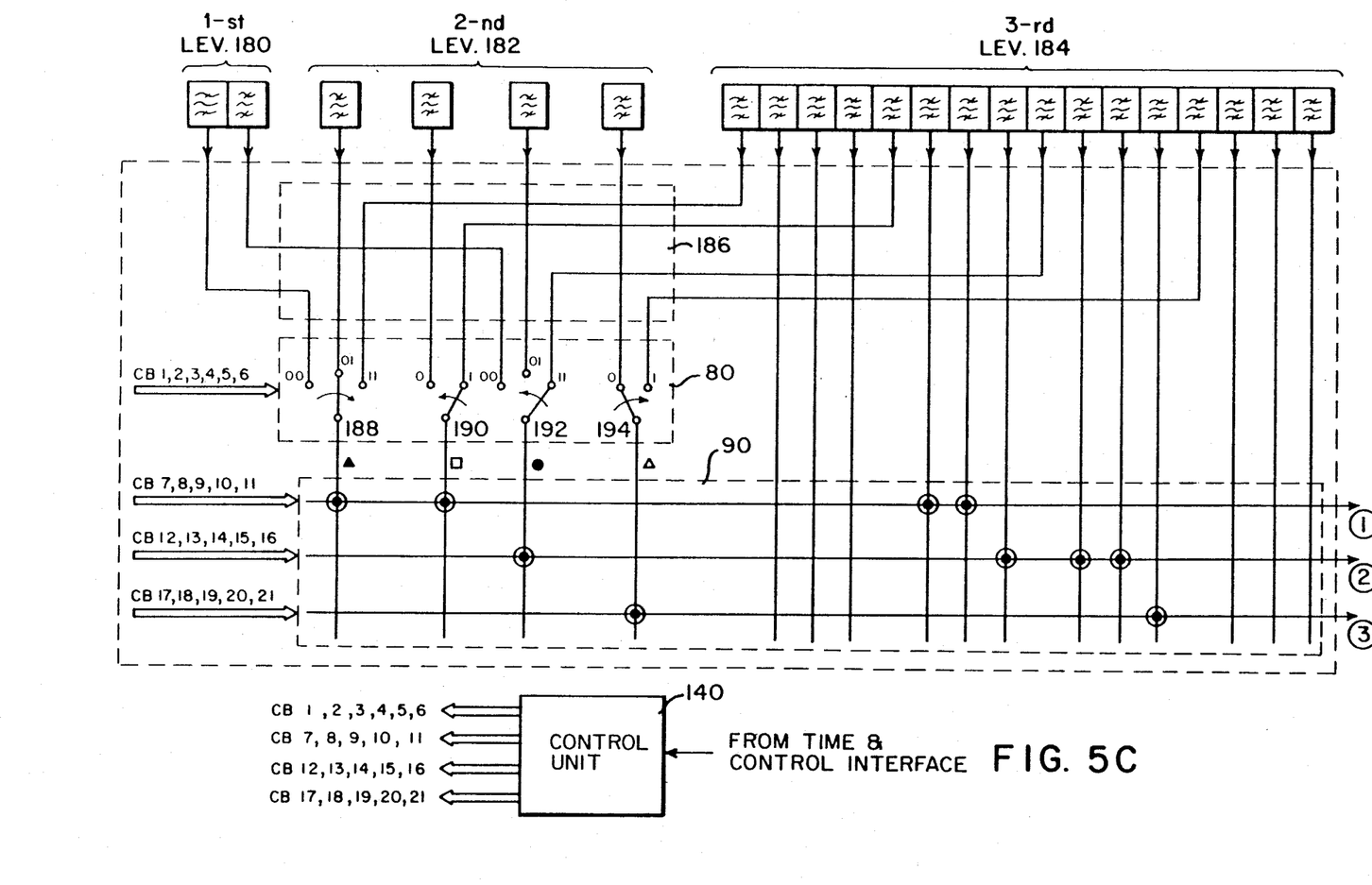

FIG. 5(c) is a circuit diagram of a switching network of he type shown in FIG. 3, with switch settings appropriate for generating the channelization scheme shown in FIG. 5(b).

In FIG. 5(a), sequence labeling is made utilizing a trellis diagram superimposed on the channelization plan of the channelizer. A binary numerical representation is adopted which is suitable for implementation by digital control signals. Control signals are generated by control units such as the units 101, 102 and 103 of FIG. 3. In FIG. 5(a), each possible VBVCF channel sequence is identified by a path within the trellis diagram represented by dashed lines (branches) and black dots (nodes). Each branch is associated with the channels underneath and each node represents an option to choose among channels at different levels. Starting from the node 161, the VBVCF channel sequence may be initiated either by a wide channel of the first level (branch 00), a medium sized channel of the second level (branch 01), or by a narrow channel of the M-th (third) level (branch 11). Correspondingly, there are three groups of VBVCF channel sequences 165, 166, and 167 characterized by six bit words respectively beginning with digit pairs 00, 01 or 11. Moving further to the right along the branches of the trellis diagram, nodes 162, 163 and 164 are met. At these points choices are to be made as to which elementary channels must be included in the desired VBVCF channel sequence. Each trellis path crosses the channelization frequency plan from the left to the right, and is characterized by a six-bit word. Each word also represents the VBVCF channel sequence associated with a particular trellis path. For example, channel sequence 70 of FIG. 5(b) is characterized by the word 174="011110" relative to the trellis path represented by a bolder dashed line in FIG. 5(a).

FIG. 5(c) shows how such a word is used to control the SPmT switch array in a switching network of the type shown in FIG. 3. Signals from the first, second and third channelization levels 180, 182 and 184 are applied to the SPmT switch array 80 via an interconnect network 186. The SPmt switch array includes four switches 188, 190, 192 and 194 corresponding to trellis nodes 161, 162, 163 and 164. SP3T switches correspond to three option nodes and SP2T switches correspond to two option nodes in the trellis diagram. A configuration of the SPmT switch array is determined by a six-bit control signal (CB 1,2,3,4,5,6) equal to the six-bit word previously generated. The states of the switches 188, 190, 192 and 194 are defined by the first two bits, the third bit, the forth and fifth bits, and by the sixth bit, respectively. Controller 140 provides the control signals. The settings of the switches of FIG. 5(c) are identified by black dots at the two ends of the switch rotating arm, and are made according to the word "011110". The four outputs of the switch array provide the four channels of sequence 70 indicated by the symbols ▲□●△. The other channels in the sequence 70, all belonging to the third channelization level are directly coupled to the crossbar switch matrix. These channels are indicated by a letter D in FIG. 5(a) (channels with crossed bars in FIG. 4).

Once the designed VBVCF sequence of elementary channels is obtained, different block channels must be routed to different downlink beams. For example, in FIG. 5(b), it is assumed that at a certain instant of time, the channel sequence 70 is split into three blocks 71, 72, and 73 destined to downlink beams 1, 2 and 3. The task of connecting simultaneously non-overlapping frequency-multiplexed channels to one output port is carried out by the coupler crossbar matrix 90 of FIG. 5(c). The switch points are of the type shown in FIG. 3. Encircled black dots indicate closed switch points and provide the correct connections to meet the routing requirements 71, 72 and 73 of FIG. 5(b). The switch controls for the switch matrix 90 are of conventional type, consisting of five-bit words applied to the matrix rows. There are four bits for the addresses of sixteen switch points and a one-bit state bit. In FIG. 5(c), the three words are provided by control unit 140 and are indicated as [CB 7,8,9,10,11]; [CB 12,13,14,15,16]; and [CB 17,18,19,20,21]. Note that in the example described, a time plan has not been specified for the switch controls, neither SSTDMA nor SSFDMA. For the most general case, the preferred embodiment utilizes a control unit 140 implemented by three separate controllers—an SSTDMA controller, an SSFDMA controller and an SPmT switch array controller.

Figure 6:
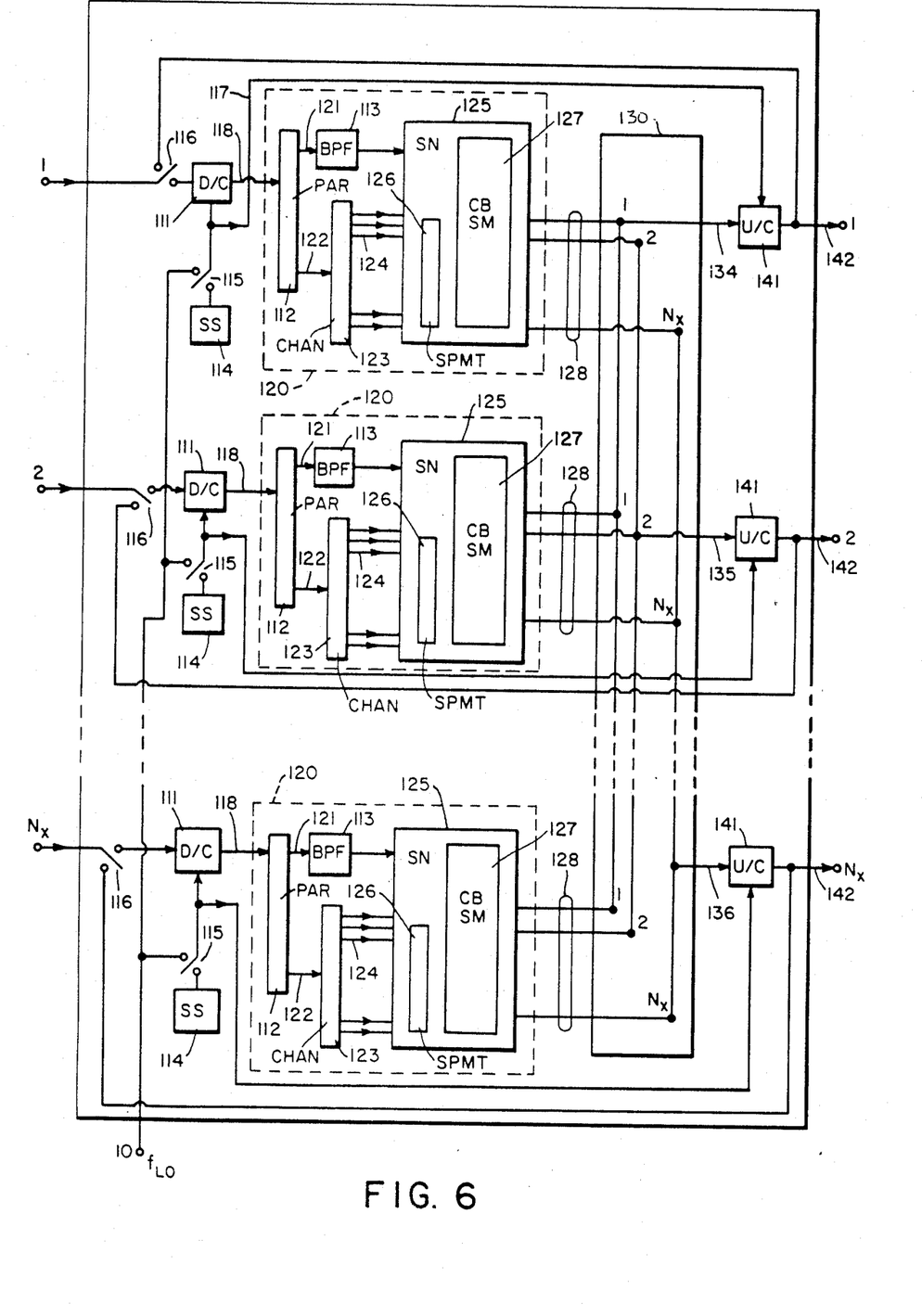
FIG. 6 is a block diagram of a preferred on-board router according to the present invention.

FIG. 6 is a detailed block diagram of a preferred on-board router according to an aspect of the invention. Input beams from 1 to $N_x < N$ support VBVCF traffic. In describing transponder traffic relative to a single beam, e.g. Beam No. 1, incoming traffic occupies a bandwidth $B_T$ centered at $f_{TC}$ as shown in FIG. 2. When switch 116 (which also may be externally controlled like other switches in the CB network) couples the input to the downconverter 111, traffic signals are frequency translated by downconverter 111 by means of local oscillator frequencies $f_{LO}+B'_x$, previously described, generated in the synthesized sources 114. A bypass switch 115 connects the synthesized source to the downconverter 111, or alternatively, allows operation with $B_x=0$. The bypass switch 116 allows the incoming traffic to bypass router processing and apply the incoming traffic directly to the CB connectivity network 12 (FIG. 1A).

Output signals from downconverter 111 are applied to a paralleling circuit 112, previously described in connection with paralleling circuit 46 of FIG. 2, via a connection transmission line 118. Paralleling circuit 112 splits traffic into two streams 121 and 122 which are forwarded to a bandpass filter 113 and to a channelizer 123, previously described in connection with channelizer 55 (FIG. 2) which is connected to a switching network 125, also previously described in connection with switch matrices of FIG. 3. The unit 120 contains the channelizer (CHAN), the paralleling circuit (PAR), the bandpass filter (BPF) and the switching network (SN). The switching network 125 contains two major units: a Single Pole Multi Throw (SPMT) array 126 performing the "Variable Bandwidth" function, and a Cross Bar Switch Matrix (CBSM) 127 performing the "Variable Center Frequency" function and routing of traffic to the downlink beams. The $N_x$ outputs 128 from each of the units 120 are multiplexed back into $N_x$ traffic channels in the output multiplexer 130. Traffic channels at the multiplexer's outputs 134, 135 and 136 are upconverted in the upconverters 141 before being sent to the router's output ports 142. Other units 120 and components thereof operate similarly.

While I have shown and described specific embodiments of this invention, further modifications and improvements will occur to those skilled in the art. For example, bandwidths and frequency specifications illustrated were chosen for purposes of illustrations, and not as a limitation. The bandwidths and operating frequencies may take on a variety of forms and specifications without departing from teachings herein. Alternative frequency plans may be implemented, not just the one shown and described. Control of all switches may be accomplished by a variety of means, including a processor, relay, or by condition responsive means. Filtering may also be accomplished by a variety of means other than filter banks. For example, digital filtering may alternatively be employed with a concomitant substitution of appropriate components to match the technology of such digital filters in accordance with the teachings herein. Upconverting and downconverting may also be accomplished by various means other than by the use of frequency mixing with a synthesized source. Accordingly, my invention encompasses those modifications and alterations as may come to those skilled in the art based upon the teaching set forth herein and is not limited to the particular embodiments shown and/or described herein.

What is claimed is:

1. A variable bandwidth variable center frequency multi-beam satellite communications system which includes multiple transponder channels for interconnecting plural incoming and outgoing communications paths, said system comprising:
   A. receiving means for receiving at least one incoming transponder channel of constant bandwidth,
   B. band-splitting means connected with said receiving means for dividing the bandwidth of said at least one transponder channel into a first portion and a second portion,
   C. multistage channelizing means connected with said band-splitting means for receiving said second portion of said at least one transponder channel, said channelizing means for being operative for further dividing said second channel into multiple levels of subchannels of variable bandwidth,
   D. switching means for connecting one-out-of-many input signals with overlapping bands to at least one output port of said transponder at successive time intervals, and for simultaneously connecting plural input signals with non-overlapping band to at least one output port of said transponder, and
   E. control means connected to said switching means for controlling the switching of SSTDMA input signals and of SSFDMA input signals.

2. A variable bandwidth variable center-frequency satellite communications system as recited in claim 1 further comprising means for varying the relative bandwidths of said first and second portions.

3. A variable bandwidth variable center-frequency satellite communications system as recited in claim 2 wherein said band-splitting means comprises manifolding means for distributing the signal between said first and second portion with minimal power loss, bandpass filter means for passing the first portion and power dividing means for dividing the signal power of said second portion.

4. A variable bandwidth variable center-frequency satellite communications system as recited in claim 3 wherein said manifolding means includes amplifier means for amplifying the power of the signal of said first and second portions.

5. A variable bandwidth variable center-frequency satellite communications system as recited in claim 2 wherein said channelizing means comprises a plurality of selectable filter banks having high skirt selectivity.

6. A variable bandwidth variable center-frequency satellite communications system as recited in claim 5 wherein said filter banks comprise a plurality of groups of constant bandwidth filters to establish multilevel channelization in a parallel configuration thereby reducing additive losses and distortion of a serial configuration.

7. A variable bandwidth variable center-frequency satellite communications system as recited in claim 6 wherein the filter banks of adjacent subchannels have asymmetric transmission amplitude characteristics at the edges thereof.

8. A variable bandwidth variable center-frequency satellite communications systems as recited in claim 1 wherein said receiving means includes frequency translating means for translating the frequency of said at least one transponder channel.

9. A variable bandwidth variable center-frequency satellite communications system as recited in claim 8 wherein the center-frequency of said translating means matches the center-frequency of said at least one transponder channel.

10. A variable bandwidth variable center-frequency satellite communications system as recited in claim 9 wherein said frequency translating means comprises a local oscillator which includes means for generating a plurality of frequencies to effect center-frequency alignment of said at least one transponder channel.

11. A method for providing variable bandwidth variable center-frequency multi-beam communication in a satellite system which includes multiple transponder channels for interconnecting plural incoming and outgoing communications signals, said method comprising the steps of:
- A. dividing the bandwidth of at least one of said transponder channels into a first portion having a first center frequency and a second portion having a second center frequency,
- B. channelizing said second portion of the transponder channels into a plurality of groups of subchannels of successive levels of selectable bandwidth,
- C. connecting, in accordance with traffic demands, one-out-of-many input signals with overlapping bands to at least one output port of transponder at successive time intervals, and simultaneously connecting plural input signals with non-overlapping bands to at least one output port of said transponder, and
- D. controlling said connecting step by effecting SSTDMA and SSFDMA switching of said respective input and output signals of said at least one transponder channel in accordance with traffic demands.

12. A method as recited in claim 11 wherein said dividing step includes the step of frequency-translating said at least one transponder bandwidth for varying the relative bandwidths of said first and second portions.

13. A method as recited in claim 11 wherein said channelizing step includes the step of power dividing said second portion into M stages each having n equal narrowhead levels, where M and n are integers.

* * * * *